(12) United States Patent
Lee

(10) Patent No.: US 7,857,559 B2
(45) Date of Patent: Dec. 28, 2010

(54) TIEDOWN PROVISION PRODUCT

(76) Inventor: David J. Lee, 9801 Conestoga Way, Potomac, MD (US) 20854

( * ) Notice: Subject to any disclaimer, the term of this patent is extended or adjusted under 35 U.S.C. 154(b) by 595 days.

(21) Appl. No.: 11/836,964

(22) Filed: Aug. 10, 2007

(65) Prior Publication Data

US 2009/0041556 A1    Feb. 12, 2009

(51) Int. Cl.
*B60P 7/08* (2006.01)
(52) U.S. Cl. .............. 410/81; 410/23; 410/97
(58) Field of Classification Search ........ 410/7, 410/12, 11, 21, 23, 81, 96, 97, 100, 106; 24/265 CD; 224/403; 248/499
See application file for complete search history.

(56) References Cited

U.S. PATENT DOCUMENTS

| 5,607,270 A | 3/1997 | Zimmerman |
| 6,099,218 A | 8/2000 | Ferrari |
| 6,729,815 B2 * | 5/2004 | Hornady .............. 410/47 |
| 6,805,269 B2 | 10/2004 | Lockard |

* cited by examiner

*Primary Examiner*—Stephen Gordon
(74) *Attorney, Agent, or Firm*—David J. Bremer

(57) ABSTRACT

The tiedown product comprises a rod having a first end which passes through a first opening at a first side of a load. The rod also has a second end which passes through a second opening at a second side of the load. A first tiedown attaching provision is on the rod first end. A second tiedown attaching provision is on the rod second end. Tiedown lashings can connect between the tiedown attaching provisions and a cargo deck to restrain the load on the cargo deck. The rod carries force from the tiedown lashings thus preventing this force from harming the load.

6 Claims, 8 Drawing Sheets

TIEDOWN PROVISION PRODUCT

The tiedown product comprises a rod having a first end which passes through a first opening at a first side of a load. The rod also has a second end which passes through a second opening at a second side of the load. A first tiedown attaching provision is on the rod first end. A second tiedown attaching provision is on the rod second end.

The rod carries force from tiedown means thus preventing this force from harming the load. In one form of the invention the first tiedown provision and the second tiedown provision can each rotate about an axis orthogonal to the long axis of the rod and can rotate about the long axis of the rod, which also helps transfer forces from the tiedown means to the rod. The rod can fit loosely within the opening so that force from tiedown means at the first side is transmitted through the rod to tiedown means at the second side, bypassing the load.

This solves a problem in an unexpected way. The problem arose when it was found that the ears used for attaching tiedown means to a trailer designed to a US military specification were deformed by forces from tiedown means. The expected solution was to redesign the trailer so that the provision for attaching tiedown means would have the required strength.

The tiedown specifications are given in the US Department of Defense document "Interface Standard for Lifting and Tiedown Provisions" MIL-STD-209K of 22 Feb. 2005, which is herein incorporated by reference in it's entirety. Tiedown provisions described herein meet the requirements of the abovementioned MIL-STD-209K.

The unexpected solution was to fit a rod between the ears and attach new tiedown provisions for attaching the tiedown means to the rod ends. It was discovered that this did solve the problem.

Though the invention was made to solve a specific tiedown problem it was seen that the invention can also easily improve tiedown art generally.

The invention provides progress over prior tiedown art because it solves a problem by ways and means which the prior art—individually and in combination—does not apply to the problem.

The invention solves the problem by the unexpected discovery that a rod passing across a load with provisions for attaching tiedown means on the rod ends can relieve other parts of the load from forces from tiedown means.

That the tiedown prior art—individually and in combination—teaches away from ways and means to make this discovery is clear evidence that the discovery was not expected by others skilled in the relevant art.

That alternate ways and means to solve the problem are much less economical is clear evidence that the discovery was not expected by others skilled in the relevant art.

Figure 1:
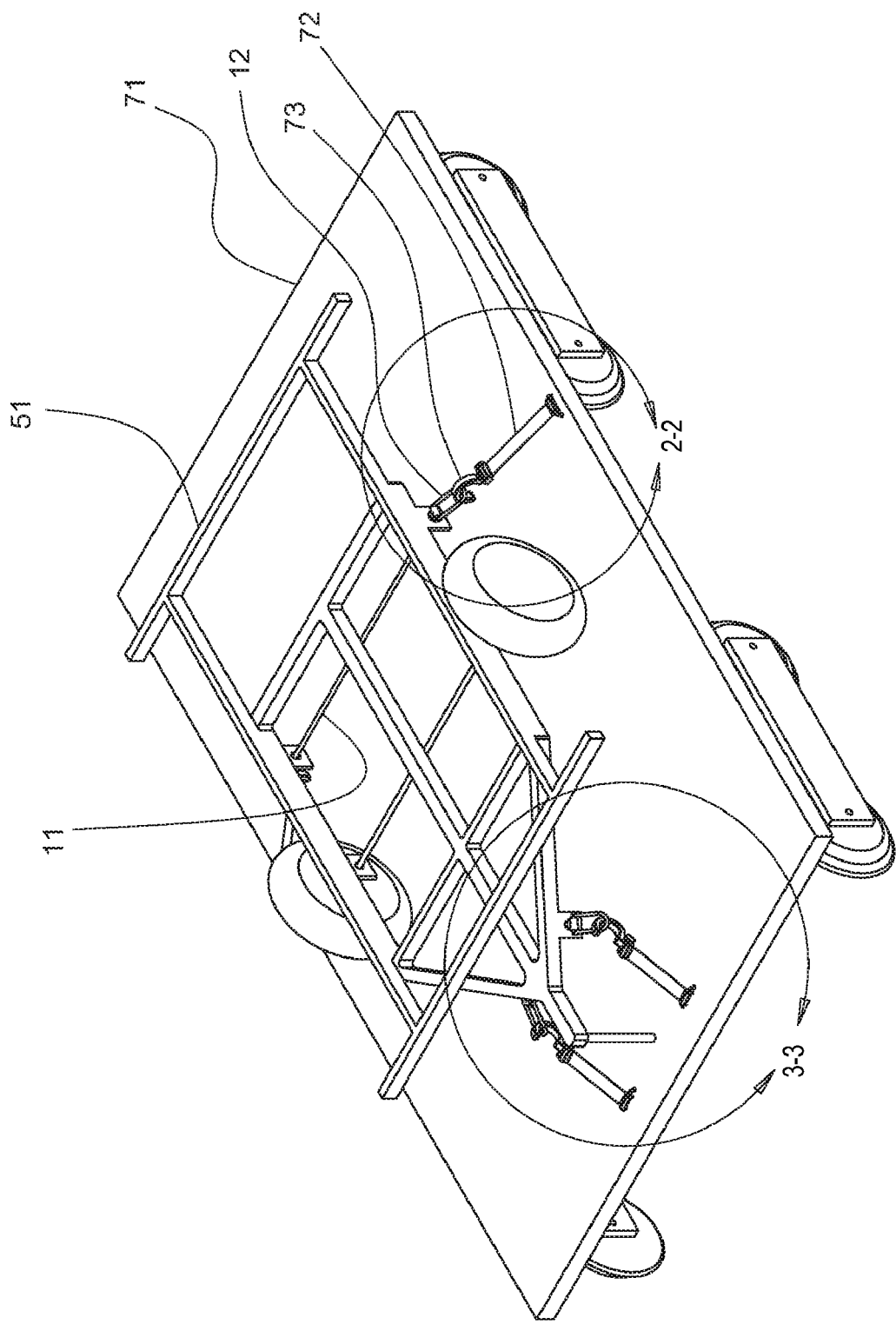
FIG. 1 is a perspective view showing the invention in use with a chassis tied down onto a cargo deck.
Figure 2:
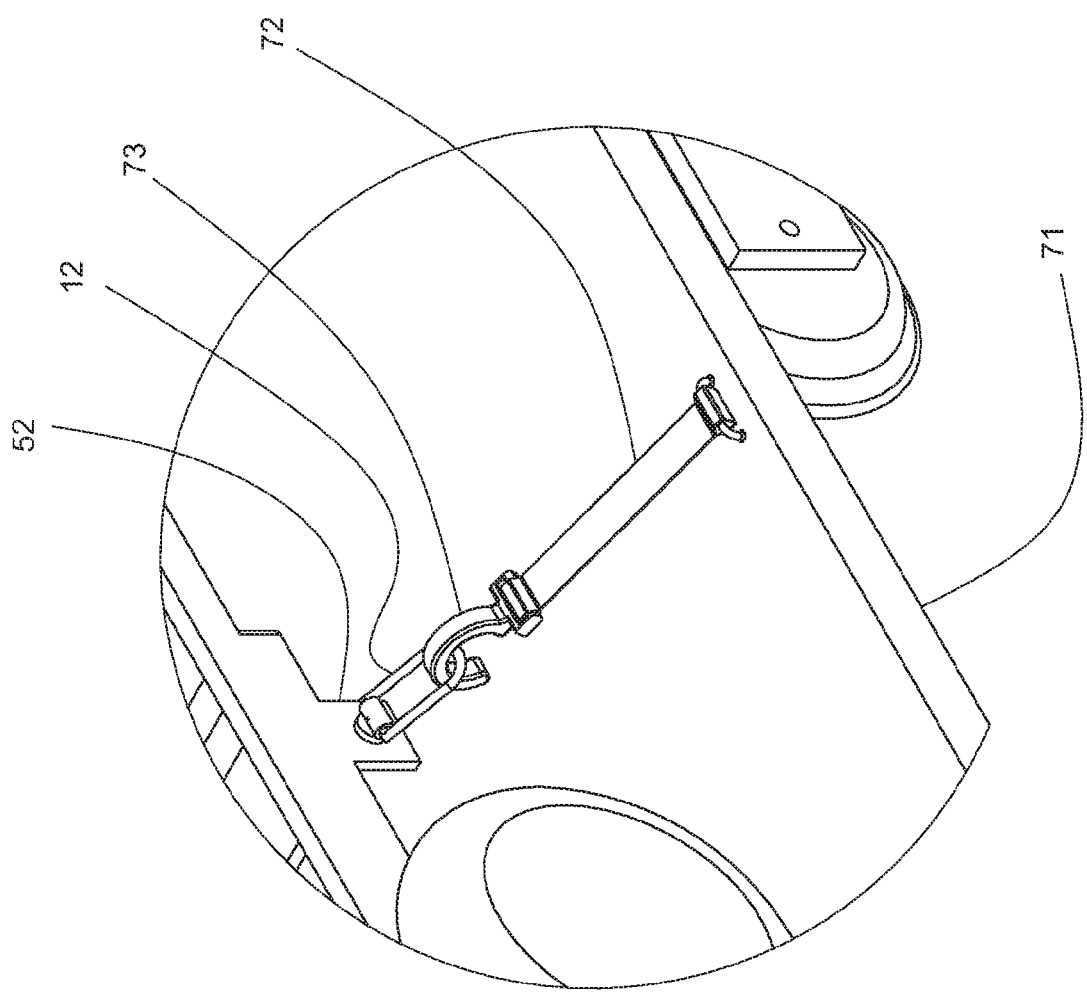
FIG. 2 is an enlarged view of part of the tiedown means and the tiedown provision provided by the invention.
Figure 3:
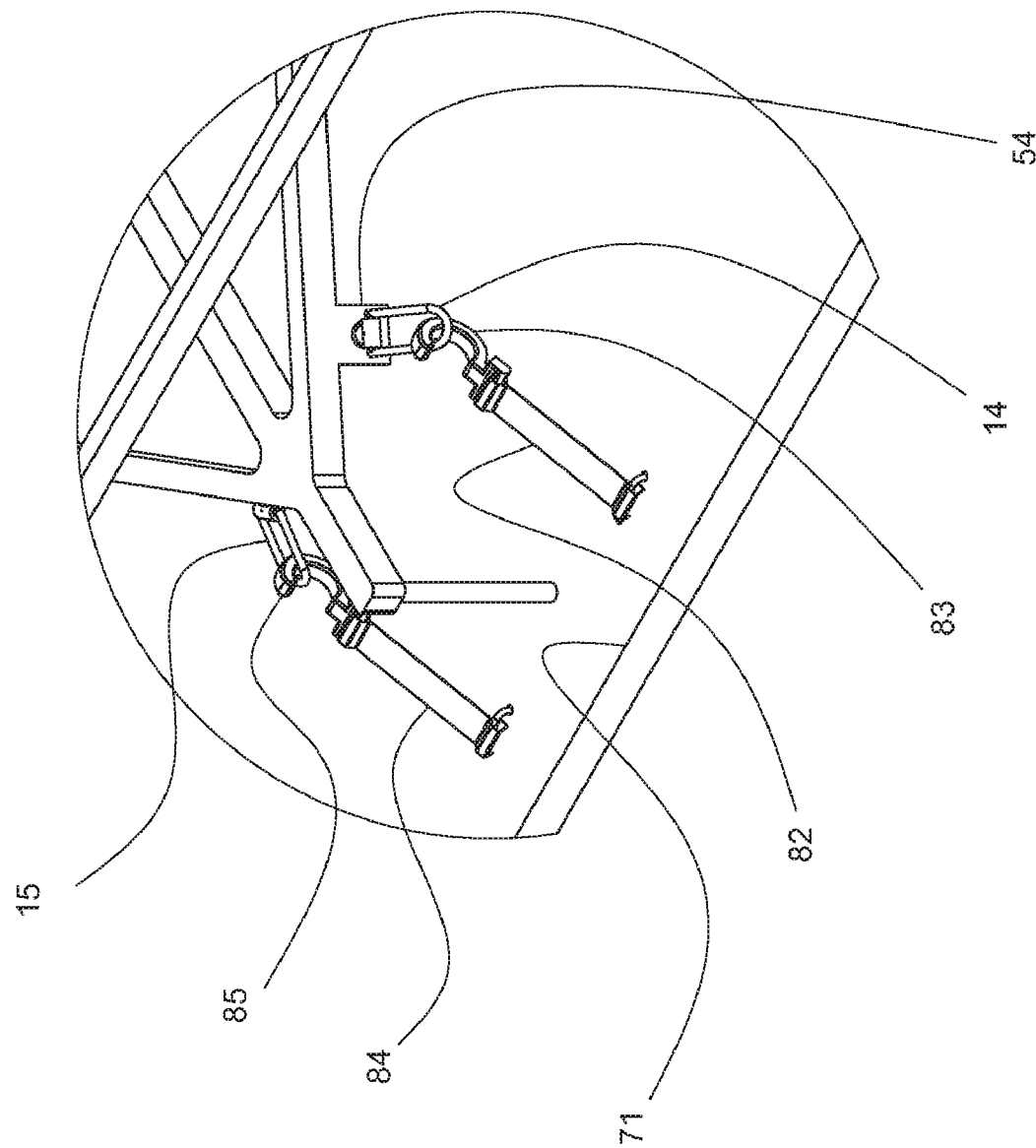
FIG. 3 is an enlarged view of another part of the tiedown means and the tiedown provisions provided by the invention.
Figure 4:
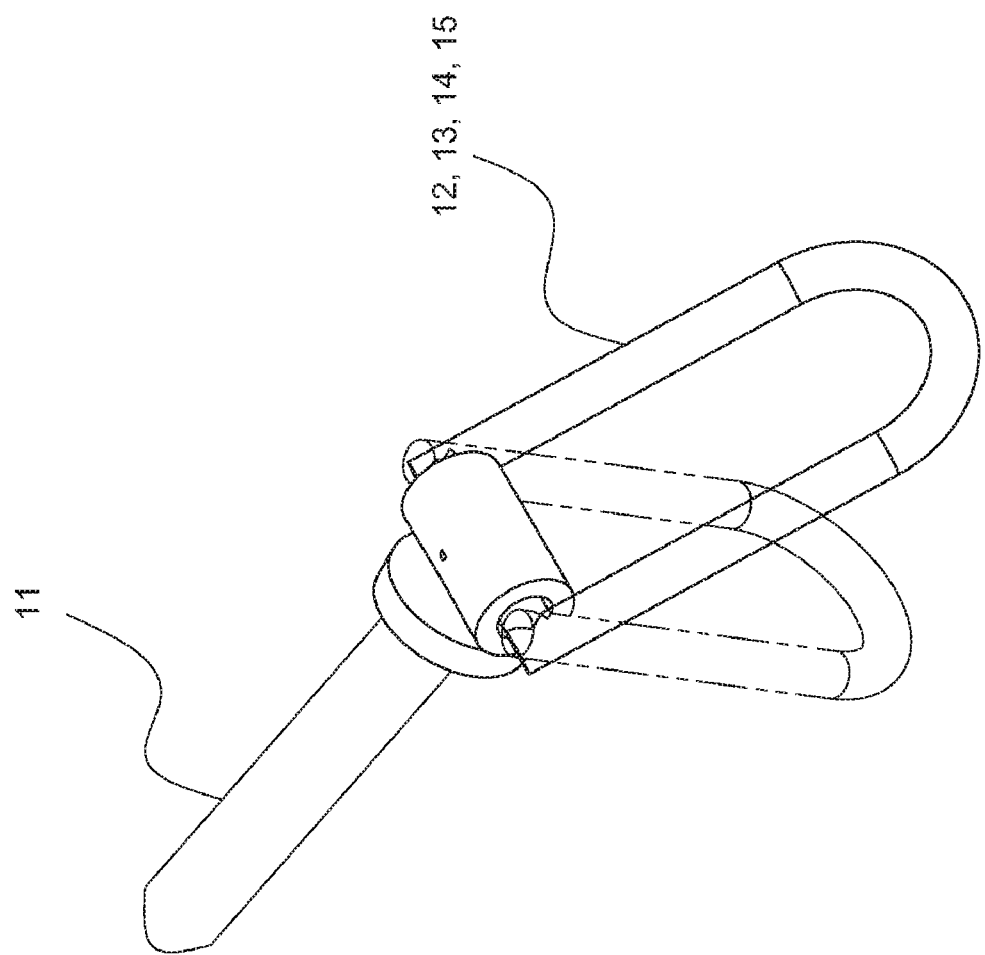
FIG. 4 shows how the tiedown provision provided by the invention can rotate about an axis orthogonal to the rod.
Figure 5:
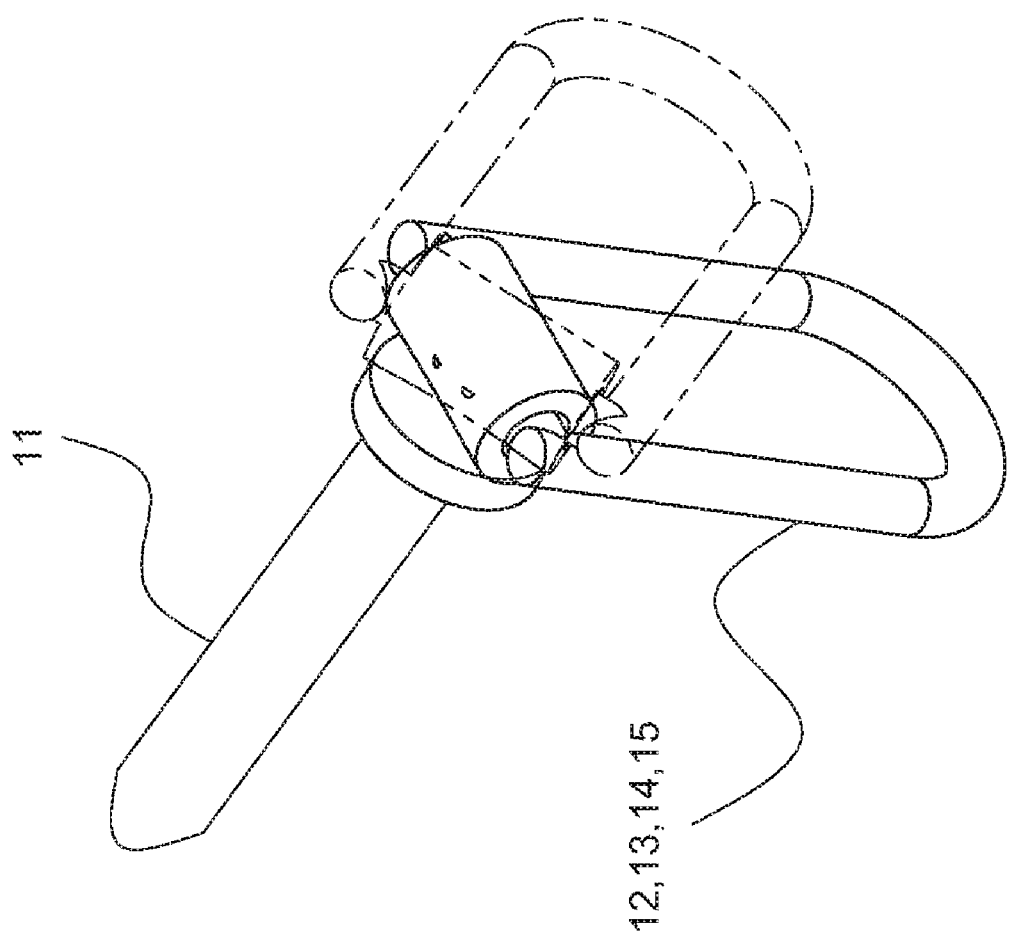
FIG. 5 shows how the tiedown provision provided by the invention can rotate about the long axis of the rod.
Figure 6:
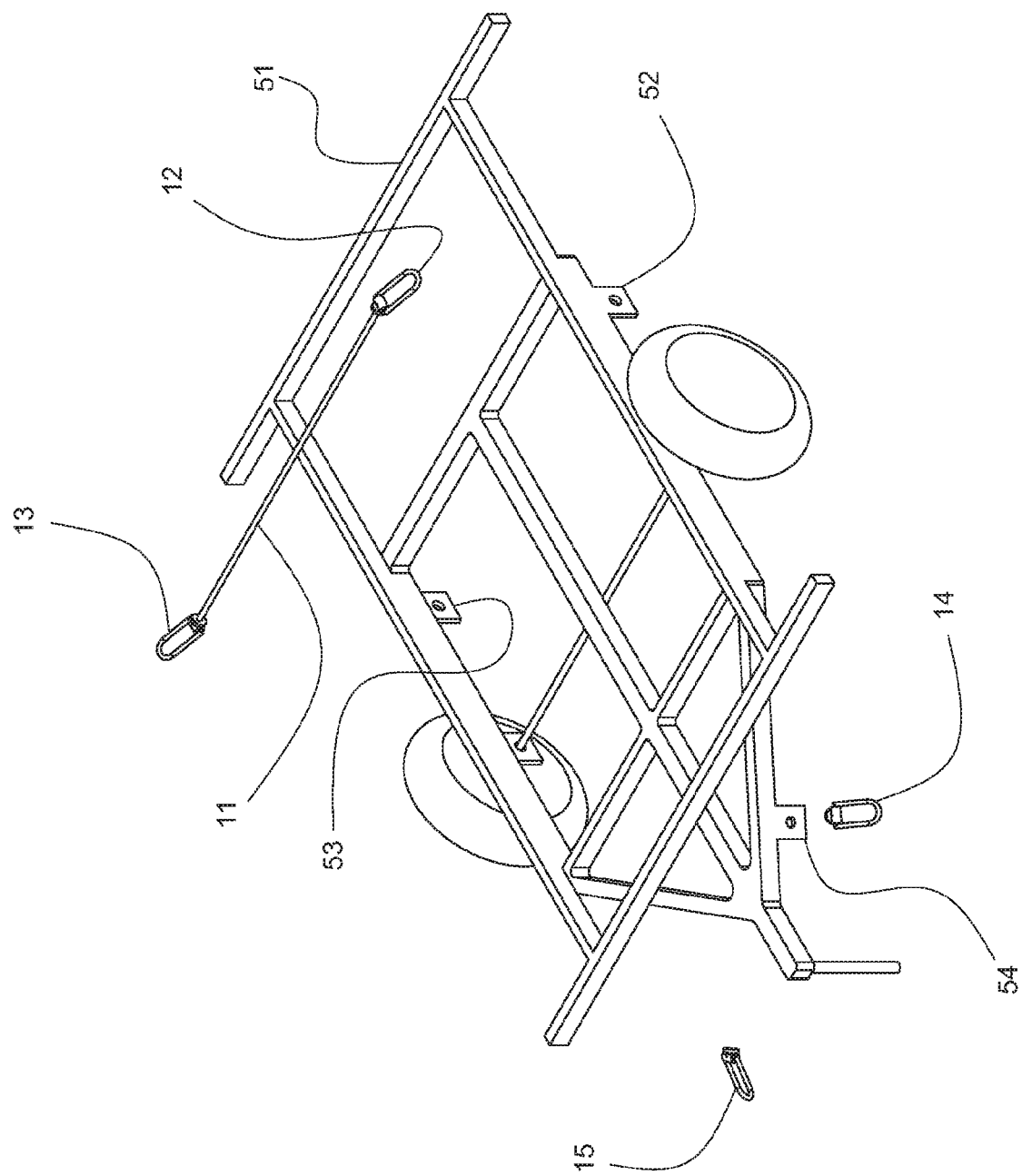
FIG. 6 shows the invention separated from the chassis.
Figure 7:
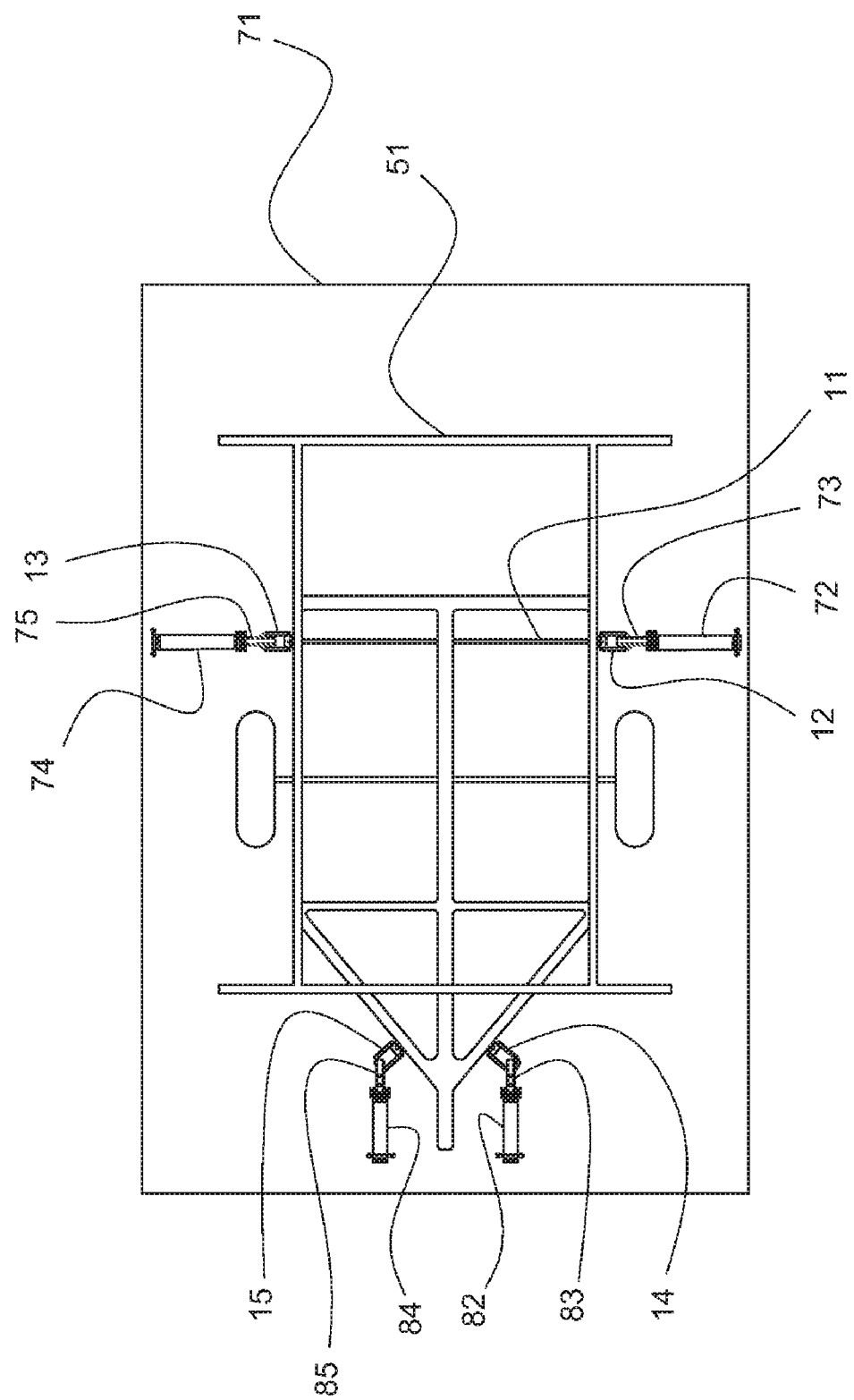
FIG. 7 is a view from above showing the invention in use with a chassis tied down onto a cargo deck.
Figure 8:
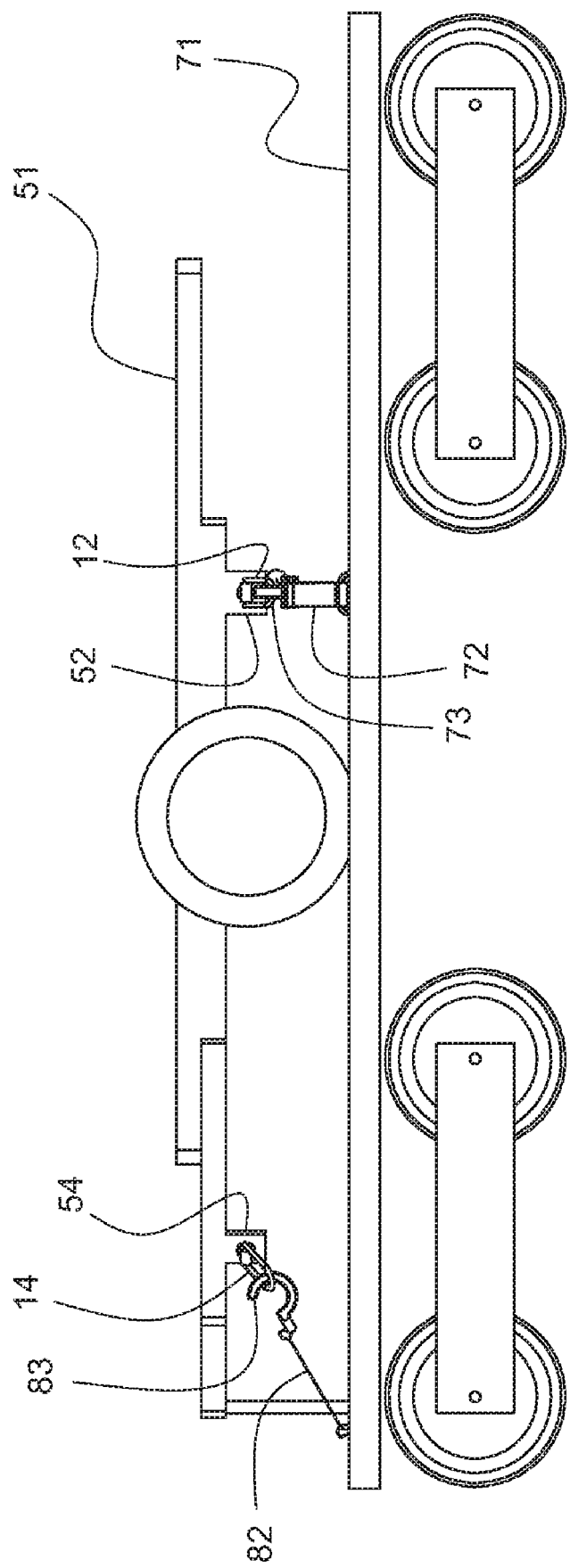
FIG. 8 is a view from a side showing the invention in use with a chassis tied down onto a cargo deck.

The tiedown product comprises a rod 11 having a first end which passes through a first opening at a first side of a load 51. The rod has a second end which passes through a second opening at a second side of the load. A first tiedown provision 12 is on the rod first end. A second tiedown provision 13 is on the rod second end.

This structure can be used in many tie down situations where it is desired to carry forces caused by tiedown means so that the load is not harmed by these forces. The figures show the specific application for which the invention was made.

The load can be a chassis 51. The chassis can be the chassis of a vehicle. More generally the chassis can be any framework which supports an inanimate object.

The first opening can be through a first ear 52 attached to the chassis. The second opening can be through a second ear 53 attached to the chassis.

The first tiedown provision can be a first ring 12 which can be hooked into by a first tiedown means 72 and 73 which can be attached onto a cargo deck 71. The second tie down provision can be a second ring 13 which can be hooked into by a second tiedown means 74 and 75 which can be attached onto the cargo deck.

The rod is shown to have a circular cross section and the openings in the ears are shown to be circular. Other shapes are possible. The rings are shown to be "D" shaped. Other shapes are possible.

Many tiedown situations have the equivalents of the first ear and the second ear so the product has applications well beyond this specific case.

A third ring 14 can be attached to the chassis where the third ring can be hooked into by a third tiedown means 82 and 83 which can be attached onto the cargo deck. A fourth ring 15 can be attached to the chassis where the fourth ring can be hooked into by a fourth tiedown means 84 and 85 which can be attached onto the cargo deck.

A more specific form of the tiedown product comprises a rod 11 having a first end passing through a first opening in a first ear 52 attached to a chassis 51. The rod has a second end passing through a first opening in a second ear 53 attached to the chassis.

A first ring 12 is on the rod first end where the first ring can be hooked into by a first tiedown means 72 and 73 which is attached onto a cargo deck 71. A second ring 13 is on the rod second end where the second ring can be hooked into by a second tiedown means 74 and 75 which is attached onto the cargo deck.

Again, this more specific form of the invention can work with equivalent structures in many tiedown situations.

A third ring 14 can be attached on the chassis where the third ring can be hooked into by a third tiedown means 82 and 83 which is attached onto the cargo deck. A fourth ring 15 can be attached on the chassis where the fourth ring can be hooked into by a fourth tiedown means 84 and 85 which is attached onto the cargo deck.

An even more specific form of the tiedown product comprises a rod 11 having a first end passing through a first opening in a first ear 52 attached to a chassis 51. The rod has a second end passing through a second opening in a second ear 53 attached to the chassis.

A first ring 12 is on the rod first end where the first ring can be hooked into by a first tiedown means 72 and 73 which is attached onto a cargo deck 71. A second ring 13 on the rod second end where the second ring can be hooked into by a second tiedown means 74 and 75 which is attached onto the cargo deck.

A third ring 14 is attached through a third opening in a third ear on the chassis where the third ring can be hooked into by a third tiedown means 82 and 83 which is attached onto the cargo deck. A fourth ring 15 is attached through a fourth opening in a fourth ear (not seen) on the chassis where the fourth ring can be hooked into by a fourth tiedown means 84 and 85 which is attached onto the cargo deck.

The first ring, the second ring, the third ring, and the fourth ring meet the military specification for tiedown provisions given in the US Department of Defense document "Interface Standard for Lifting and Tiedown Provisions" MIL-STD-209K of 22 Feb. 2005.

Each of the four rings is interchangeable with each other. This is also needed to meet the military specification given in the US Department of Defense document "Interface Standard for Lifting and Tiedown Provisions" MIL-STD-209K of 22 Feb. 2005.

The tiedown provisions 12 and 13 are connected to the rod as required to meet the attachment specifications described in the abovementioned MIL-STD-209K. The tiedown provisions 14 and 15 are connected to the chassis as required to meet the non-removable attachment specifications described in the abovementioned MIL-STD-209K.

Tiedown means can connect to tiedown provisions via methods other than hooking into the provisions. For example, tiedown means can be straps and chains and cables that pass through the rings.

The first ring, the second ring, the third ring and the fourth ring can each rotate about an axis orthogonal to the long axis of the rod. The first ring, the second ring, the third ring and the fourth ring can each rotate about the long axis of the rod.

The first ear, the second ear, the third ear, and the fourth ear can meet the military specification for tiedown provisions given in the US Department of Defense document "Interface Standard for Lifting and Tiedown Provisions" MIL-STD-209K of 22 Feb. 2005.

The invention claimed is:

1. A tiedown product comprising:
   a rod having a first end passing through a first opening in a first ear, where the first ear is attached to a load carried on a cargo deck,
   the rod having a second end passing through a second opening in a second ear, where the second ear is attached to the load;
   a first ring on the rod first end where the first ring can be hooked into by a first tiedown means which is attached onto the cargo deck;
   a second ring on the rod second end where the second ring can be hooked into by a second tiedown means which is attached onto the cargo deck.

2. The product of claim 1 wherein:
   a third ring is attached to the load where the third ring can be hooked into by a third tiedown means which is attached onto the cargo deck; and
   a fourth ring is attached to the load where the fourth ring can be hooked into by a fourth tiedown means which is attached onto the cargo deck.

3. A tiedown product comprising:
   a rod having a first end passing through a first opening in a first ear, where the first ear is attached to a load carried on a cargo deck,
   the rod having a second end passing through a second opening in a second ear, where the second ear is attached to the load;
   the rod first end fitting loosely within the first opening;
   the rod second end fitting loosely within the second opening
   a first ring on the rod first end where the first ring can be hooked into by a first tiedown means which is attached onto the cargo deck;
   a second ring on the rod second end where the second ring can be hooked into by a second tiedown means which is attached onto the cargo deck;
   a third ring which is attached through a third opening in a third ear on the load where the third ring can be hooked into by a third tiedown means which is attached onto the cargo deck; and
   a fourth ring which is attached through a fourth opening in a fourth ear on the load where the fourth ring can be hooked into by a fourth tiedown means which is attached onto the cargo deck.

4. The tiedown product of claim 1 wherein:
   the rod first end fits loosely within the first opening; and
   the rod second end fits loosely within the second opening.

5. The tiedown product of claim 1 wherein the rod extends perpendicularly to a load longitudinal axis from the first ear across the load to pass through the second ear.

6. The tiedown product of claim 1 wherein the rod is solidly cylindrical and rigid.

* * * * *